United States Patent [19]

Pullen

[11] Patent Number: 4,503,616

[45] Date of Patent: Mar. 12, 1985

[54] PARALLEL MOTION DISPLACEMENT TRANSDUCERS

[75] Inventor: Roger J. Pullen, Bognor Regis, England

[73] Assignee: Schlumberger Electronics (U.K.), Ltd., Farnborough-Hampshire, England

[21] Appl. No.: 375,521

[22] Filed: May 6, 1982

[30] Foreign Application Priority Data

May 12, 1981 [GB] United Kingdom ............... 8114378

[51] Int. Cl.³ .................................... G01B 7/02
[52] U.S. Cl. .................................... 33/172 E
[58] Field of Search ............ 33/169 R, 174 L, 172 L, 33/172 B, 147, 148

[56] References Cited

U.S. PATENT DOCUMENTS

| 3,122,838 | 3/1964 | Uhlig | 33/172 B |
| 3,180,030 | 4/1965 | Witzke . | |
| 3,781,997 | 1/1974 | Pagella et al. | 33/143 L |
| 3,946,492 | 3/1976 | Dubose | 33/174 L X |

FOREIGN PATENT DOCUMENTS

| 2118318 | 7/1972 | France . |
| 538107 | 7/1973 | Switzerland . |
| 584462 | 1/1947 | United Kingdom . |
| 587127 | 4/1947 | United Kingdom . |
| 720132 | 12/1954 | United Kingdom . |
| 1312813 | 4/1973 | United Kingdom . |
| 1388527 | 3/1975 | United Kingdom . |
| 1477508 | 6/1977 | United Kingdom . |
| 1530550 | 11/1978 | United Kingdom . |

Primary Examiner—Harry N. Haroian
Attorney, Agent, or Firm—Dale V. Gaudier

[57] ABSTRACT

In a parallel motion finger probe, the parallel motion arm is rigidly connected to a shaft which is supported in a linear ball sleeve bearing, instead of by a parallel motion linkage as in prior finger probes. The parallel motion arm can be biassed in either of its two opposite directions of movement by a leaf spring, whose biassing force and direction can be adjusted by a control wheel having an eccentric groove co-operating with a pin on a spring control arm to which the spring is connected. The leaf spring also serves to prevent rotation of the parallel motion arm about the axis of the bearing. Displacement of the parallel motion arm is sensed by an inductive displacement transducer of the LVDT type.

9 Claims, 2 Drawing Figures

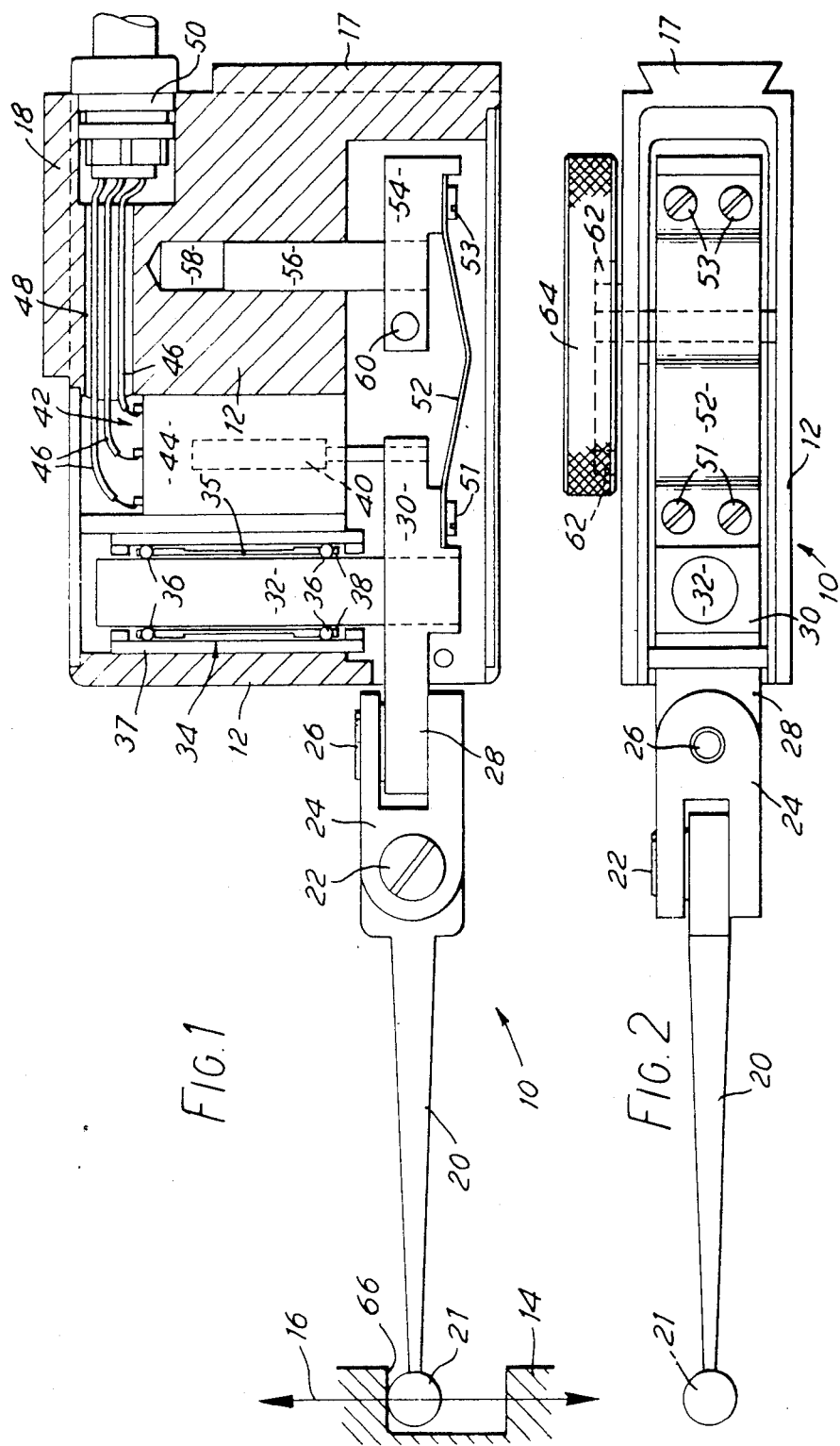

PARALLEL MOTION DISPLACEMENT TRANSDUCERS

This invention relates to parallel motion displacement transducers for sensing position or displacement, and is more particularly but not exclusively concerned with such transducers of the type known as parallel motion finger probes.

In many measurement and control applications, there exists a requirement for sensing the position or displacement, along a given line, of an object such as a tool or a workpiece. The normal way of meeting this requirement is to couple a conventional linear displacement transducer, which is aligned with the given line, to the object. However, sometimes the shape or position of the object is such that a conventional linear displacement transducer cannot conveniently be used, for example because it is desired to sense the position or displacement of a recess or other region of limited access in the object. In this case, a parallel motion finger probe can be used.

A known type of parallel motion finger probe comprises a stylus arm or finger, having one end which can project into such a recess or like limited access region of the object, and which is connected to a parallel motion arm. The parallel motion arm extends parallel to the aforementioned given line, and its opposite ends are connected to fixed structure via respective parallel leaf springs extending substantially perpendicularly to the parallel motion arm. Such an arrangement forms a parallel motion linkage, which constrains the parallel motion arm to move parallel to the given line in response to movements of the end of the finger along the given line. The displacement of the parallel motion arm can then be sensed by any convenient displacement sensor.

However, this known type of finger probe suffers from the drawback that the springs effectively shorten slightly as they flex, thus disturbing the working position of the stylus arm, and may also twist a little. These undesired movements mean that the movement of the parallel motion arm does not faithfully reproduce the movement of the object along the given line, thus producing small but significant measurement errors.

It is an object of the present invention to provide a parallel motion displacement transducer in which the aforementioned drawback is substantially eliminated.

According to the present invention, there is provided a parallel motion displacement transducer for sensing the position or displacement of an object, the transducer comprising:

a movable probe member having one end adapted to contact and be moved by the object;

a parallel motion member connected to the other end of the probe member, said parallel motion member being laterally offset from, and constrained by a linear rolling-element bearing to move parallel to, the line along which said one end of the probe member is moved by the object; and displacement sensing means for sensing the position or displacement of the parallel motion member, further comprising a leaf spring connected to the parallel motion member so as to bias it in one direction along the axis of said bearing while substantially preventing it from rotating about said axis.

The invention will now be described, by way of example only, with reference to the accompanying drawings, in which:

FIG. 1 is a side view, partly in section, of a parallel motion finger probe in accordance with the invention; and FIG. 2 is a view of the underside of the probe of FIG. 1.

The parallel motion finger probe shown in FIGS. 1 and 2 is indicated generally by reference 10, and comprises a main frame 12 which is adapted to be fixedly positioned, in normal use, adjacent to an object 14 whose displacement or position along a line indicated at 16 is to be sensed. To this end, the external surface of the frame 12 is provided with two integrally formed dovetail mounting fixtures 17 and 18, which permit the transducer 10 to be selectively mounted in either of two mutually perpendicular orientations.

Projecting from the lower left hand corner of the frame 12 (as viewed in FIG. 1) is a movable stylus arm or finger 20, having at its tip a ball 21 for contacting the aforementioned object 14. The stylus arm 20 is pivotally connected at 22 to a swivel link 24, which is in turn pivotally connected at 26 to one end 28 of a parallel motion arm 30. The pivot axes of the pivotal connections 22, 26 are mutually perpendicular, so that the swivel link 24 and the connections 22, 26 together form a universal joint between the stylus arm 20 and the parallel motion arm 30. This universal joint is provided so that any one of a wide variety of different orientations between the stylus arm 20 and the parallel motion arm 30 can be selected, to suit a wide variety of different shapes, orientations and directions of movement of the object 14. However, the joint is relatively stiff, so that once a desired orientation of the stylus arm 20 has been selected, the stylus arm may be regarded as being rigidly fixed to the parallel motion arm 30 in the selected orientation.

The end 28 of the parallel motion arm 30 projects from the interior of the frame 12, where the remainder of the arm 30 is disposed. Within the frame 12, the arm 30 is glued or otherwise rigidly connected to a hardened steel shaft 32, which projects perpendicularly from the arm 30 and is coaxially supported in a linear bearing 34.

The linear bearing 34 comprises a sleeve 35, which is typically made of brass.* Each end of the sleeve 35 is provided with two axially spaced, angularly offset, sets of circumferentially distributed steel ball bearings 36, typically 6 mm in diameter. The ball bearings 36 are mounted in respective radially inwardly tapering holes 38 through the wall of the sleeve 35, being inserted in these holes from outside the sleeve so that portions of their respective surfaces project into the sleeve to support the shaft 32. The diameter of the radially inward opening of each of the holes 38 is slightly smaller than the diameter of the balls 36, and the radially outward opening of each hole is peened over around its respective ball, so that the balls are trapped in the wall of the sleeve 35.

*The sleeve 35 is co-axially disposed in, and axially moveable with respect to, a steel sleeve 37 which is fixedly secured to frame 12.

The parallel motion arm 30 is also glued or otherwise rigidly connected, again within the frame 12, to a cylindrical nickel/iron core 40, which forms a part of a conventional inductive displacement sensor 42 of the linear voltage differential transformer (LVDT) type. The axis of the core 40 is parallel to that of the linear bearing 34, and the core is coaxially disposed and axially movable within an annular coil assembly 44. The coil assembly 44 is fixedly secured to the frame 12, and forms the remainder of the sensor 42. Output leads 46 from the coil assembly 44 pass through a channel 48 within the frame 12 to an electrical connector 50, which is mounted in the rear face of the frame adjacent the mounting fixture 17.

The parallel motion arm 30 is connected by screws 51 to one end of a leaf spring 52, whose other end is connected by screws 53 to a movable control arm 54. The control arm 54 is in turn rigidly connected to a stub shaft 56, which extends perpendicularly therefrom and parallel to the shaft 32, and which is received as a sliding fit in a cylindrical recess 58 in the frame 12. A link pin 60 projects perpendicularly to both the control arm 54 and the stub shaft 56 (ie perpendicularly to the plane of FIG. 1), and engages in a circular groove 62 which is eccentrically disposed in one face of a control knob or wheel 64 rotatably mounted in the frame 12 on one side face of the transducer 10. Rotation of the wheel 64 causes the control arm 54 to move upwards and downwards as viewed in FIG. 1, this movement being guided by the sliding engagement of the stub shaft 56 in its recess 58. The movement of the control arm 54 in turn varies the magnitude and direction of the biassing force exerted on the parallel motion arm 30, and thus on the stylus arm 20, by the leaf spring 52.

In use, the transducer 10 is mounted so that the axis of the linear bearing 34 (ie the common axis of the shaft 32 and the sleeve 35) is parallel to the line 16 along which the displacement or position of the object 14 is to be sensed. This is readily realisable in practice, since the axis of the linear bearing 34 is precisely oriented with respect to the mounting fixtures 17,18 (parallel to the former, perpendicular to the latter). Assuming that the stylus arm 20 is already correctly oriented the wheel 64 is then rotated so as to bias the ball 21 of the stylus arm into contact with the object 14, at the surface 66 thereof, with the desired contact pressure.

Thereafter, any change in the position of the object 14 along the line 16 moves the ball 21 along this line, and thus correspondingly moves the whole stylus arm 20 and the parallel motion arm 30 parallel to the line by the same amount. The parallel motion arm 30 is constrained to move accurately parallel to the line 16 by the engagement of the shaft 32 in the linear bearing 34, within which the shaft 32 is a very precise fit, and thus accurately reproduces the movement of the ball 21 by the object 14. The displacement of the parallel motion arm 30 is accurately sensed by the sensor 42, which is appropriately energised to produce an output signal representative of this displacement via the connector 50.

Rotational movement of the parallel motion arm 30 about the axis of the shaft 32 is substantially prevented by the leaf spring 52, which is relatively stiff in directions perpendicular to the plane of FIG. 1.

Several modifications can be made to the described embodiment of the invention. For example, rolling elements other than the ball bearings 36 can be used in the linear bearing 34. Also, displacement sensors other than the LVDT sensor 42 can be used to sense the displacement of the parallel motion arm 30. Further, the transducer 10 can, if desired, be fixed to a movable structure, which is moved into contact with a stationary object whose position with respect to a reference position is to be sensed.

I claim:

1. A parallel motion displacement transducer for sensing the position or displacement of an object, the transducer comprising:
    a housing;
    an elongate movable probe member having one end disposed outside the housing and adapted to contact and be moved in a direction transverse to its length by the object;
    a parallel motion member connected to the other end of the probe member and supported by a linear rolling-element bearing disposed within the housing, said bearing having a longitudinal axis, and said parallel motion member constrained by said bearing to move parallel to said axis and thus parallel to the line along which said one end of the probe member is moved by the object;
    displacement sensing means disposed within the housing for sensing the position or displacement of the parallel motion member;
    a leaf spring coupled between the housing and the parallel motion member so as to bias the parallel motion member in one direction along the axis of said bearing while substantially preventing it from rotating about said axis; and
    means, coupled to the leaf spring, for adjusting the magnitude and direction of the biassing force produced by the leaf spring.

2. A transducer as claimed in claim 1, wherein said rolling-element bearing is a ball bearing.

3. A transducer as claimed in claim 1, wherein the rolling-element bearing is a rolling-element sleeve bearing and said parallel motion member includes a shaft movable axially therein.

4. A transducer as claimed in claim 3, wherein said shaft is made of hardened steel.

5. A transducer as claimed in claim 3, wherein the displacement sensing means is inductive and comprises a core movable within at least one coil, and wherein the core extends parallel to, and is rigidly coupled to, said shaft.

6. A transducer as claimed in claim 1, wherein the leaf spring is connected between the parallel motion member and a control member movable with respect to the housing in a direction substantially parallel to the direction of movement of the parallel motion member, the position of said control member determining the magnitude and direction of the biassing force.

7. A transducer as claimed in claim 6, further comprising a rotary control knob for controlling the position of the control member, said knob being rotatable about an axis substantially perpendicular to the direction of movement of the control member and having in one face thereof an eccentrically disposed circular groove, and the control means having a pin which engages in said groove.

8. A transducer as claimed in claim 1, wherein the orientation of the probe member with respect to the parallel motion member is adjustable.

9. A transducer as claimed in claim 9, wherein the probe member is connected to the parallel motion member via a relatively stiff universal joint.

* * * * *